United States Patent
Li

(10) Patent No.: US 6,840,159 B1
(45) Date of Patent: Jan. 11, 2005

(54) FOOD STEAMING DEVICE

(75) Inventor: Wen-Ching Li, 7F, No. 66, Sec. 3, Min-Chuan E. Rd., Taipei City (TW)

(73) Assignee: Wen-Ching Li, Taipei (TW)

( * ) Notice: Subject to any disclaimer, the term of this patent is extended or adjusted under 35 U.S.C. 154(b) by 0 days.

(21) Appl. No.: 10/863,168

(22) Filed: Jun. 8, 2004

(51) Int. Cl.[7] .............................. A23L 1/00; A47J 27/00; A47J 27/04; A47J 37/00; A21B 1/00

(52) U.S. Cl. .............................. 99/337; 99/403; 99/413; 99/415; 99/417; 99/418; 99/446

(58) Field of Search .......................... 99/330–333, 337, 99/338, 339, 340, 345–347, 403, 418, 444–450, 473–476, 467, 483, 516, 536; 219/400, 401, 415, 442; 126/369, 369.1, 369.2, 20, 21.9; 426/510, 511, 523

(56) References Cited

U.S. PATENT DOCUMENTS

| | | | | |
|---|---|---|---|---|
| 244,180 A | * | 7/1881 | Campbell | 126/369 |
| 354,240 A | * | 12/1886 | Roberts | 126/369 |
| 1,622,591 A | * | 3/1927 | Killion | 43/115 |
| 2,761,375 A | * | 9/1956 | Ivar | 99/344 |
| 3,078,783 A | * | 2/1963 | Lee, Sr. | 99/352 |
| 5,097,753 A | * | 3/1992 | Naft | 99/341 |
| 5,189,947 A | * | 3/1993 | Yim | 99/415 |
| 5,275,094 A | * | 1/1994 | Naft | 99/416 |
| 5,458,050 A | * | 10/1995 | Su | 99/340 |
| 5,584,235 A | * | 12/1996 | DuBois et al. | 99/413 |
| 6,173,643 B1 | * | 1/2001 | Qian et al. | 99/339 |
| 6,196,115 B1 | * | 3/2001 | Tsao | 99/339 |
| 6,267,046 B1 | * | 7/2001 | Wanat | 99/332 |

* cited by examiner

Primary Examiner—Timothy F. Simone
(74) Attorney, Agent, or Firm—Webb Ziesenheim Logsdon Orkin & Hanson, P.C.

(57) ABSTRACT

A food steaming device includes a water container, a heater, a liquid collecting unit, and a steaming tray. The water container has a first bottom wall and a surrounding wall that cooperate to define a chamber. The first bottom wall has a heat conductive hollow protrusion. The heater is provided removably below the water container, and has a heating element projecting into and connected thermally to the hollow protrusion. The liquid collecting unit is mounted on the water container, and has a second bottom wall covering the chamber and a blocking ring surrounding a steam supply hole and projecting upwardly from the second bottom wall. The steaming tray is mounted on the liquid collecting unit, and is adapted to receive food. A lid covers the steaming tray.

6 Claims, 6 Drawing Sheets

FOOD STEAMING DEVICE

BACKGROUND OF THE INVENTION

1. Field of the Invention

The invention relates to a food steaming device, more particularly to a food steaming device that has a heater and a water container that are separable from each other.

2. Description of the Related Art

Referring to FIG. 1, a currently available food steaming device has a heater 1 formed with a water receiving space 10. A cylindrical hollow protrusion 11 projects upwardly from the center of the space 10. During use, water is supplied into the space 10, and then a liquid collecting unit 12, one or more steaming trays 13 (only one is shown), and a cover 14 are stacked on the heater 1. Each of the steaming trays 13 is formed with a plurality of steam holes 130 in a bottom portion thereof.

When the heater 1 is activated, water in the space 10 is heated by the hollow protrusion 11 so as to generate steam. Steam is sent upward through a central hole in the liquid collecting unit 12 and the steam holes 130 in each steaming tray 13 so as to cook the food in the respective steaming trays 13 by a steaming operation. The drawback to this kind of food steaming device is that the water receiving space 10 is formed directly in the heater 1. To clean the space 10, therefore, the heater 1 itself has to be cleaned. Because the heater 1 has electrical wires and electronic components therein, these elements may become rusted, or more serious problems may occur, such as the short circuiting of the electronic components and the user receiving an electric shock. Hence, the food steaming device with such a configuration is not safe to use.

Referring to FIG. 2, the aforementioned food steaming device may be further provided with a quick steam producing unit 21 mounted on the hollow protrusion 11. The quick steam producing unit 21 quickens the pace of which steam is produced. The quick steam producing unit 21 is a sleeve having a single layer tubular wall 210 formed with a water inlet 211 at a bottom periphery thereof and surrounding an outer periphery of the hollow protrusion 11. The tubular wall 210 and a peripheral wall 110 of the hollow protrusion 11 define therebetween a small space which confines a small amount of water therein that is isolated from the remainder of the water in the water receiving space 10. When the hollow protrusion 11 is heated, the water confined in the small space between the tubular wall 210 and the peripheral wall 110 of the hollow protrusion 11 is heated first, and then the water in the water receiving space 10 gradually enters said small space through the water inlet 211. Steam is thus produced quickly.

However, the single layer tubular wall 210 of the quick steam producing unit 21 is unable to thermally isolate the water inside said small space from the low temperature water outside said small space. As a result, the low temperature water surrounding the tubular wall 210 reduces the temperature of the tubular wall 210 so that a limited amount of the steam is produced by the quick steam producing unit 21.

SUMMARY OF THE INVENTION

Therefore, the main object of the present invention is to provide a food steaming device having a heater and a water container that are detachable from each other so that the water container can be cleaned independently from the other elements.

Another object of the present invention is to alleviate the problems encountered in the conventional food steaming device.

According to this invention, a food steaming device comprises a water container, a heater, a liquid collecting unit, a steaming tray, and a lid. The water container has a first bottom wall, and a surrounding wall that cooperates with the first bottom wall to define a chamber for holding water therein. The first bottom wall has a heat conductive hollow protrusion projecting from the first bottom wall into the chamber. The hollow protrusion opens at a bottom side of the first bottom wall. The heater is provided removably below the water container, and has a base, and a heating element projecting from the base into the hollow protrusion through the bottom side of the first bottom wall and connected thermally to the hollow protrusion to heat water through the hollow protrusion. The liquid collecting unit is mounted on the water container, and has a second bottom wall covering the chamber, a steam supply hole formed in the second bottom wall, and a blocking ring surrounding the steam supply hole and projecting upwardly from the second bottom wall. The steaming tray is mounted on the liquid collecting unit, and is adapted to receive food. The lid is for covering the steaming tray.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 3:
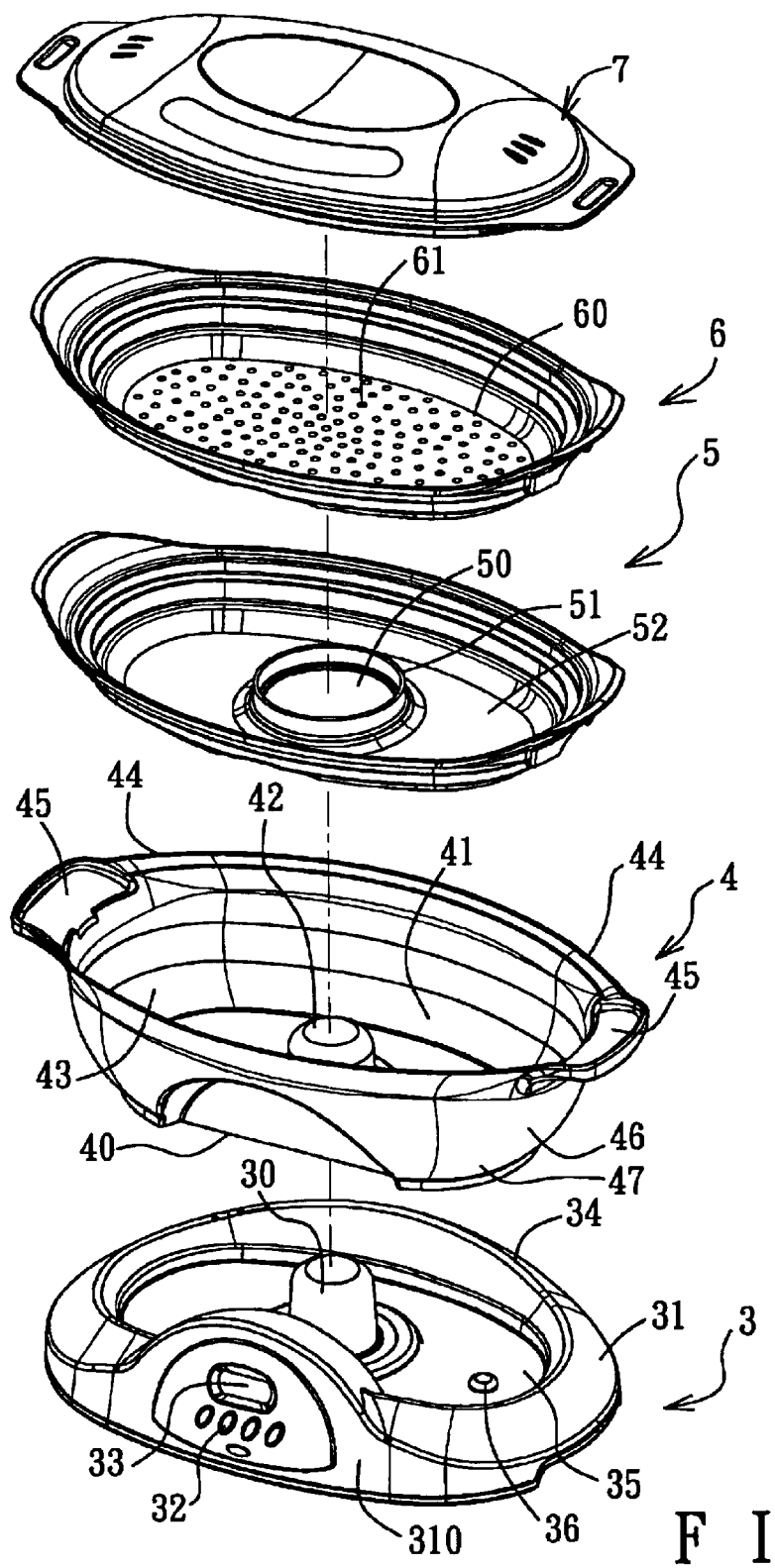
FIG. 3 is an exploded perspective view of a preferred embodiment of a food steaming device according to the present invention.
Figure 4:
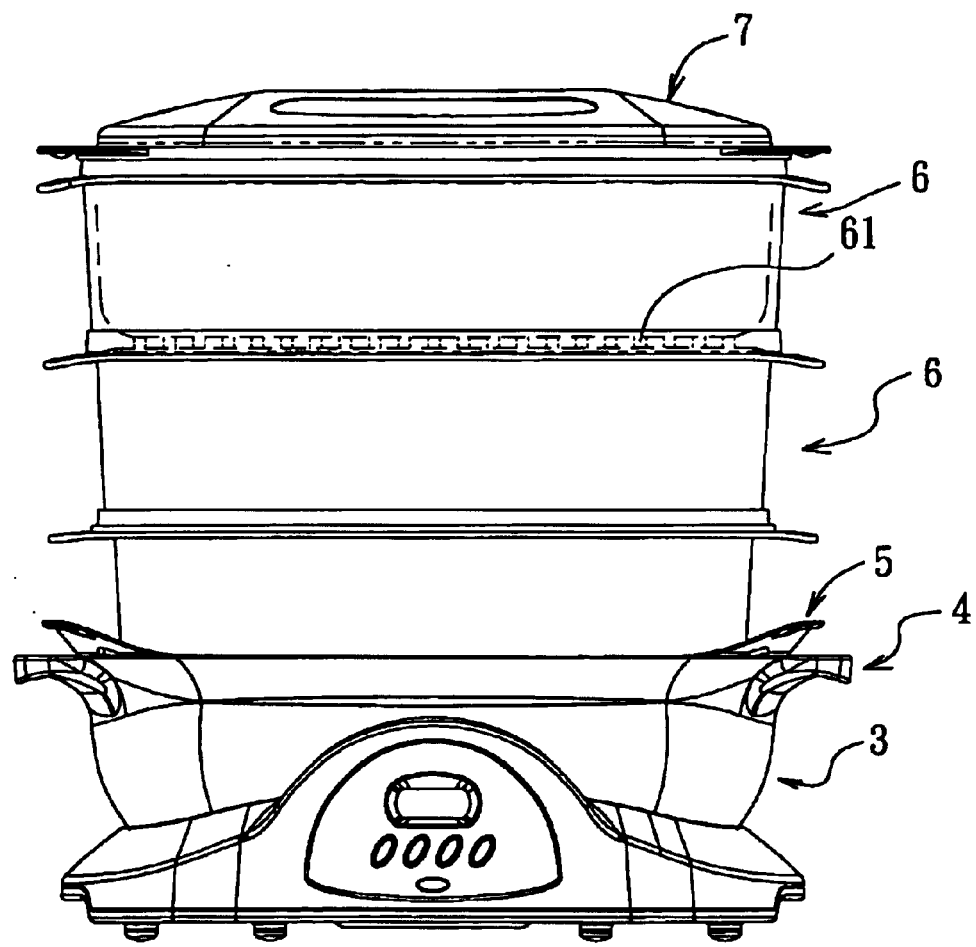
FIG. 4 is a schematic view of another preferred embodiment of a food steaming device according to the present invention in an assembled state.

Referring to FIGS. 3 and 4, a preferred embodiment of a food steaming device according to the present invention is shown to comprise a heater 3, a water container 4, a liquid collecting unit 5, a steaming tray 6, and a lid 7.

The heater 3 has a base 31, and a heating element 30 projecting from a central portion of the base 31. The base 31 has an upward peripheral wall 34, and a receiving space 35 between the heating element 30 and the upward peripheral wall 34. Heat generating electronic components, a circuit board, wires, etc., are disposed inside the base 31 in a conventional manner. The base 31 is further provided with a plurality of control buttons 32 and a display 33 at one face 310 thereof to facilitate selecting and viewing of a heating condition. The heating element 30 is waterproof. Since the configuration used to realize waterproofing of the heating element 30 is known in the art, a detailed description of the same will be dispensed herewith for the sake of brevity.

The water container 4 is mounted removably on the heater 3, and has a lower portion 47 which is configured so that the lower portion 47 is substantially in sealing contact with the upward peripheral wall 34 of the base 31 when received in the receiving space 35 in the heater 3. In this embodiment, the water container 4 has a first bottom wall 40, a surrounding wall 46 that cooperates with the first bottom wall 40 to define a chamber 41 for holding water 43 therein, two handles 45 projecting upwardly, outwardly and respectively from two opposite top side portions 44 of the surrounding wall 46, and a heat conductive hollow protrusion 42 projecting from the first bottom wall 40 into the chamber 41 and opening at a bottom side of the first bottom wall 40. The hollow protrusion 42 is waterproof. Since the configuration used to realize such waterproofing is known in the art, a detailed description of the same will be dispensed herewith for the sake of brevity. The heating element 30 projects into the hollow protrusion 42 through the bottom side of the first bottom wall 40, and thermally connects with the hollow protrusion 42 so as to heat the water 43 in the chamber 41.

The liquid collecting unit 5 is mounted on the water container 4, and has a second bottom wall 52 covering the chamber 41, a central steam supply hole 50 formed in the second bottom wall 52, and an annular blocking ring 51 surrounding the steam supply hole 50 and projecting upwardly from the second bottom wall 52.

The steaming tray 6 is mounted on the liquid collecting unit 5, and is adapted to receive food. The steaming tray 6 has a third bottom wall 60 formed with a plurality of steam holes 61. The steaming tray 6 may be provided as a single unit, as shown in FIG. 3, may be provided in duplicate, as shown in FIG. 4, or three or more of the steaming trays 6 may be provided depending on the quantity of food to be cooked. In this embodiment, one or two of the steaming trays 6 are used as shown respectively in FIGS. 3 and 4.

The lid 7 covers the uppermost steaming tray 6.

With particular reference to FIG. 4, the water container 4 is first stacked on the heater 3, then the liquid collecting unit 5 and two of the steaming trays 6 are subsequently stacked on the heater 3 in this sequence, after which the lid 7 is placed to cover the uppermost steaming tray 6. When electricity is supplied to the heater 3, heat is generated from the heating element 30 to the hollow protrusion 42 so that the water 43 in the water chamber 41 is heated and vaporized. Vapor is sent upward from the steam supply hole 50 through the steam holes 61 in each of the steaming trays 6 so as to cook the different foods in the steaming trays 6.

Because the water container 4 is made as an individual element in this embodiment, it is easy to handle, and it can be cleaned separately from the other elements. Therefore, washing of the heater 3 may be avoided such that the electronic components inside the heater 3 do not become wet. The end result is that rusting of the electronic components do not occur, and other problems and dangers, such as short circuiting of the electronic components and the user receiving an electric shock are prevented, thereby making the food steaming device of the present invention safe to use.

Furthermore, during steaming, food juices from each of the steaming trays 6 drip into the liquid collecting unit 5 for reuse or disposal. The blocking ring 51 prevents the food juices from dripping into the water 43 in the chamber 41 of the water container 4 so that the water container 4 is not stained and is thus easy to clean, the flavors of the foods in each of the steaming trays 6 can be preserved, and the steam is maintained in an odorless state.

Referring once again to FIG. 3, the heater 3 is further provided with a safety switch 36 disposed in the base 31, and is connected electrically to the circuit board (not shown) inside the base 31 in a known manner. When the water container 4 is seated on the heater 3, the lower portion 46 of the water container 4 is received in the receiving space 35, and presses down the safety switch 36, thereby activating the heating element 30. When the water container 4 is removed from the heater 3, the safety switch 36 is deactivated so that the heater 3 is turned off, thereby preventing scalding due to accidental contact with the heating element 30 of the heater 3.

Figure 5:
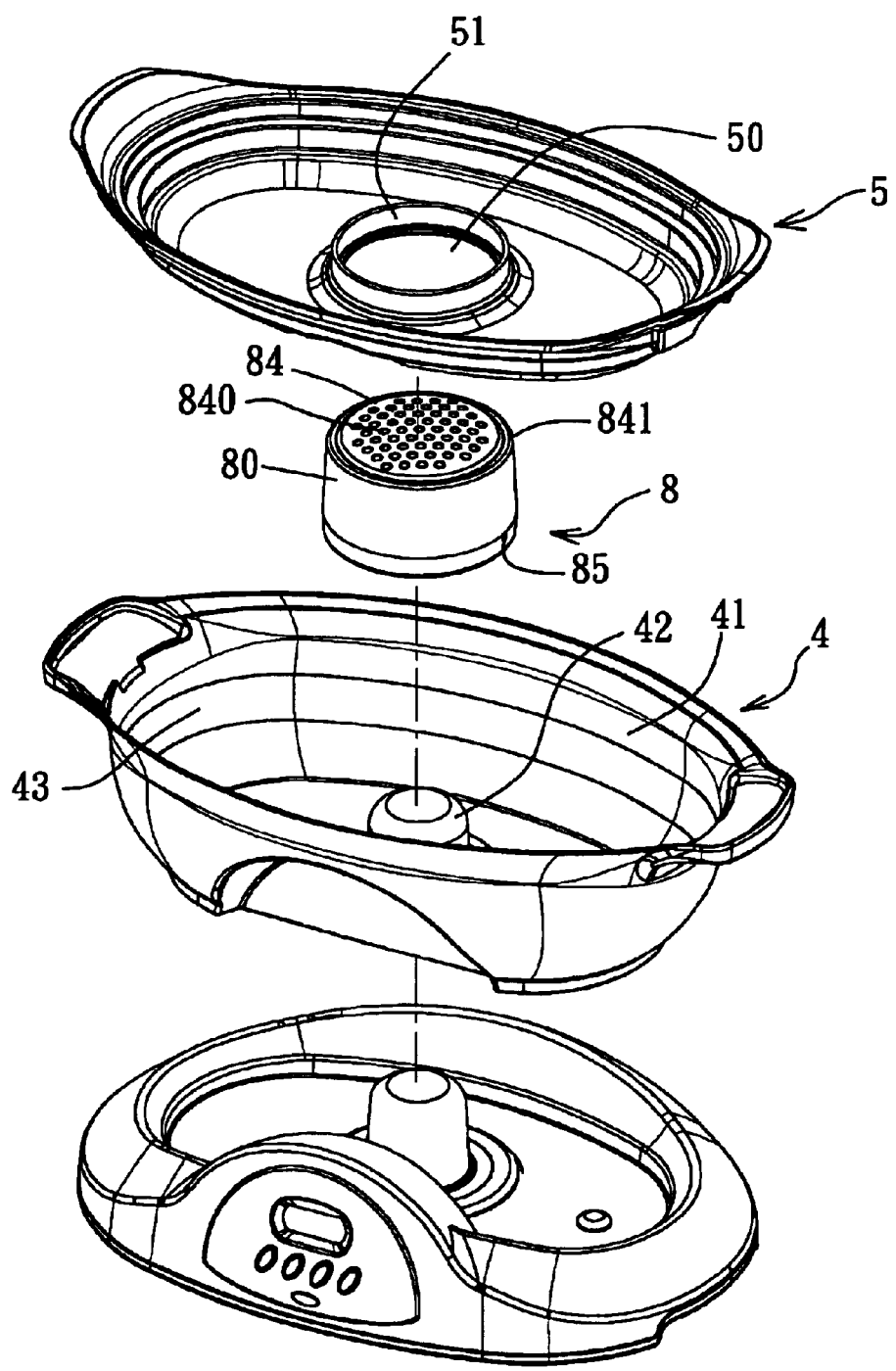
FIG. 5 is an exploded perspective view of yet another preferred embodiment of a food steaming device according to the present invention, illustrating a heater, a water container, a quick steam producing cap, and a liquid collecting unit of the preferred embodiment.
Figure 6:
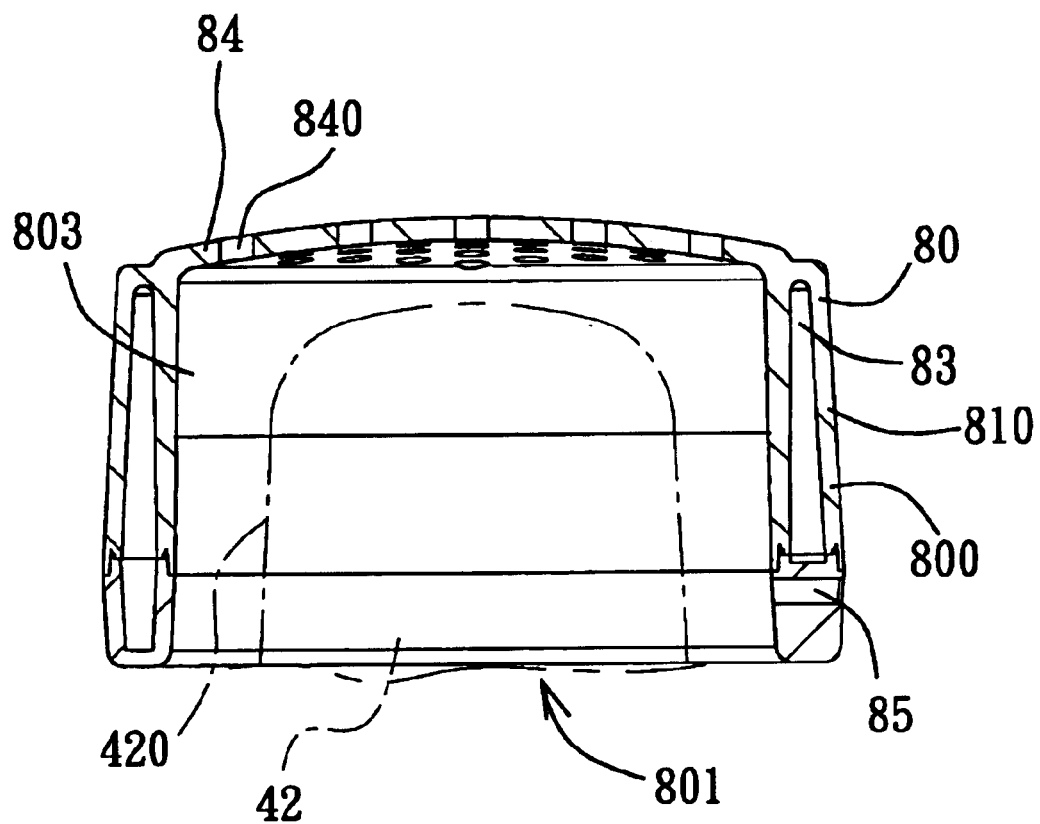
FIG. 6 is a sectional view of the quick steam producing cap of FIG. 5.

Referring to FIGS. 5 and 6, the food steaming device of the present invention may further comprise a quick steam producing cap 8 disposed around an outer periphery 420 of the hollow protrusion 42 of the water container 4. The quick steam producing cap 8 includes a jacketed tubular wall 80, and a top end wall 84 covering one end of the tubular wall 80. The jacketed tubular wall 80 has inner and outer wall layers 800, 810, a sealed insulating space 83 defined between the inner and outer wall layers 800, 810, a bottom open end 801, and a water inlet 85 proximate to the bottom open end 801 and extending through the inner and outer wall layers 800, 810 so as to communicate fluidly with the quick steam producing cap 8. The top end wall 84 has a plurality of perforations 840 intercommunicating fluidly the steam holes 61 (see FIG. 3) and the quick steam producing cap 8, and a peripheral end 841 in sealing contact with the blocking ring 51 of the liquid collecting unit 5. The inner wall layer 800 has an inner diameter larger than the outer diameter of the heat conductive hollow protrusion 42.

Figure 1:
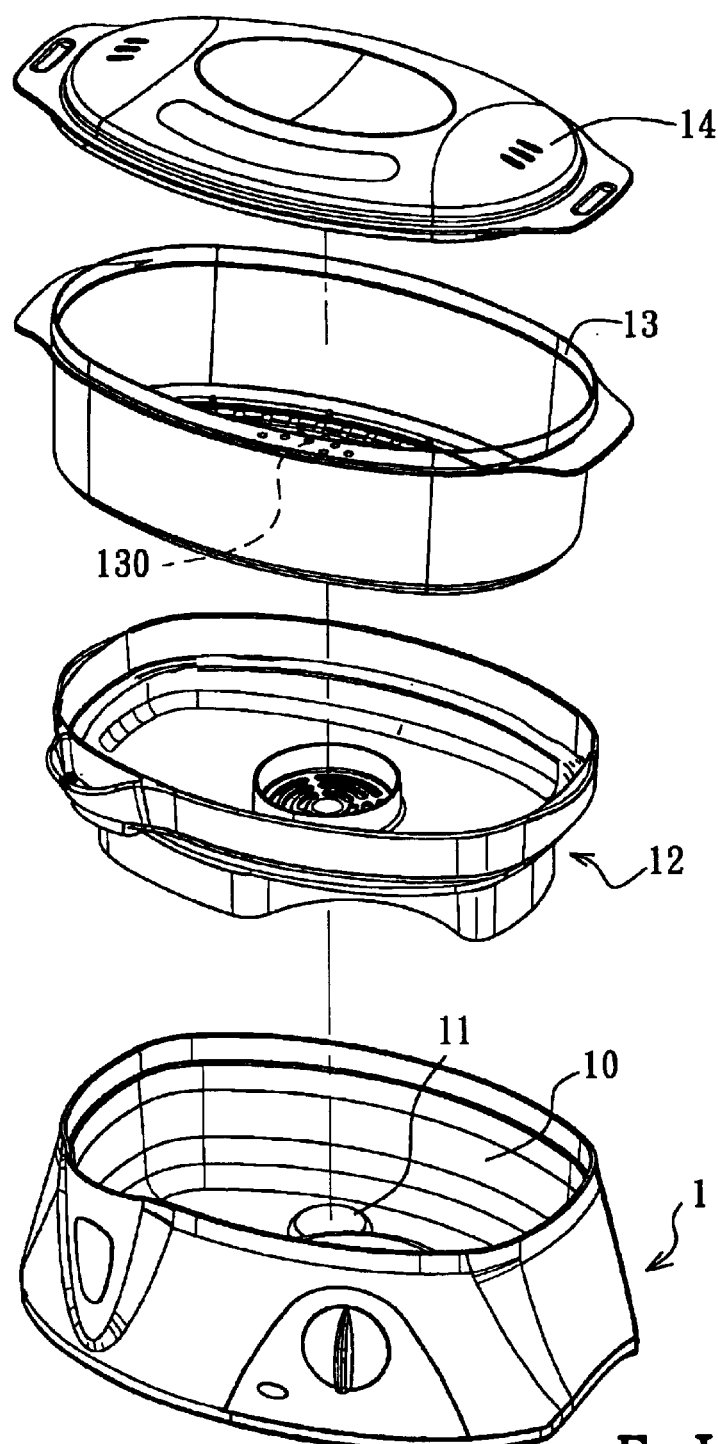
FIG. 1 is an exploded perspective view of a currently available food steaming device.
Figure 2:
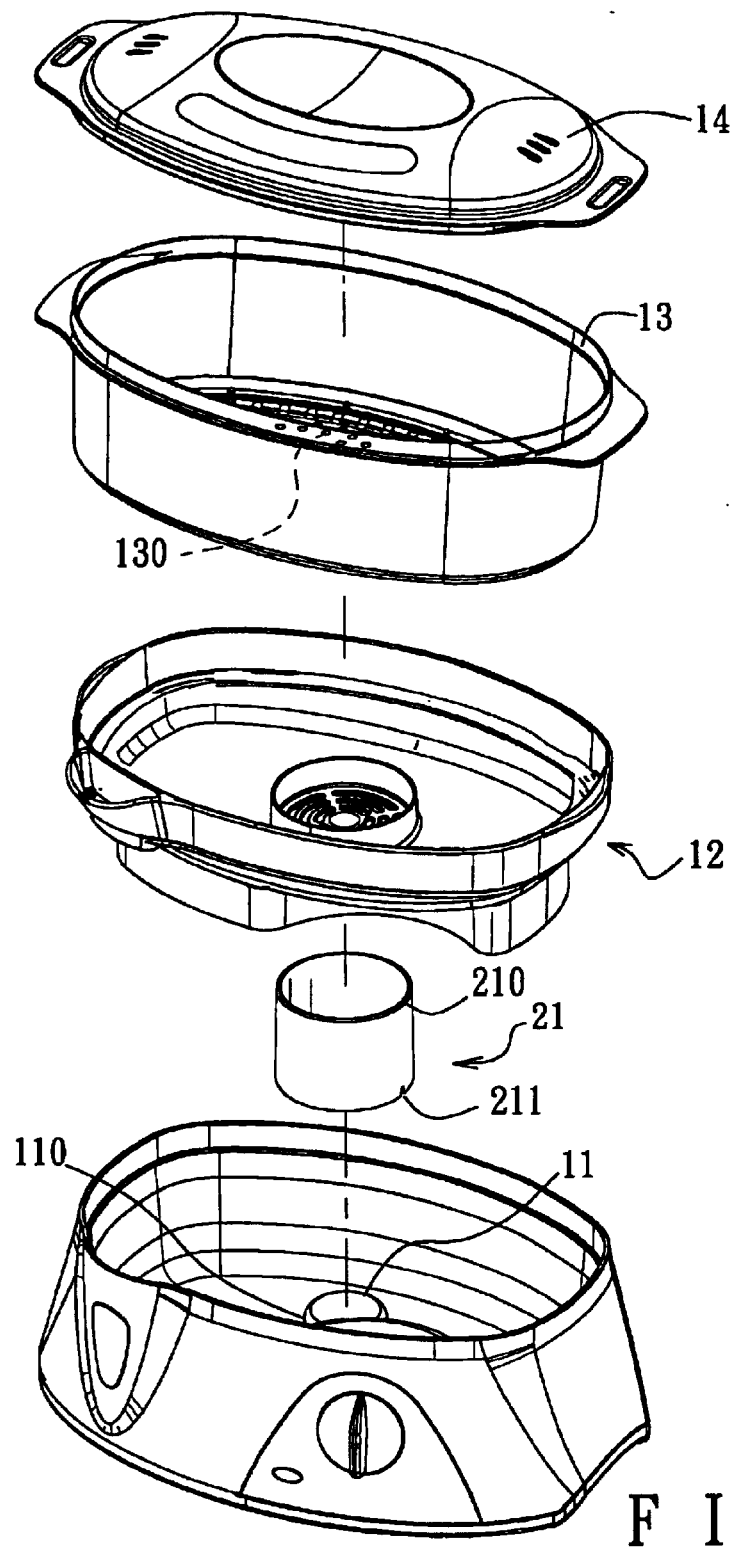
FIG. 2 is a view similar to FIG. 1, but illustrating the food steaming device further provided with a quick steam producing unit.

In use, the quick steam producing cap 8 covers the outer periphery 420 of the hollow protrusion 42. The water 43 in the water container 4 enters the quick steam producing cap 8 through the water inlet 85, and fills up a receiving space 803 defined by the inner wall layer 800 and the outer periphery 420 of the hollow protrusion 42. The water level in the receiving space 803 eventually becomes equal to that of the water 43 in the water container 4. When heat is transmitted by the hollow protrusion 42 to the water 43 in the water receiving space 803, the water 43 vaporizes quickly and is sent upward through the perforations 840 and the steam supply hole 50. The hot water 43 in the water receiving space 803 and the low temperature water 43 in the water chamber 41 are separated thermally by the sealed insulating space 83 of the jacketed tubular wall 80, so that the temperature of the water 43 in the water receiving space 803 is not lowered. Hence, the rate of producing steam using the quick steam producing cap 8 of the present invention is far greater than that obtained when using the currently available quick steam producing cap 21 shown in FIG. 2.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A food steaming device comprising:
 a water container having a first bottom wall and a surrounding wall that cooperates with said first bottom wall to define a chamber for holding water therein, said first bottom wall having a heat conductive hollow protrusion projecting from said first bottom wall into said chamber, said hollow protrusion opening at a bottom side of said first bottom wall;

a heater provided removably below said water container, and having a base, and a heating element projecting from said base into said hollow protrusion through said bottom side of said first bottom wall and connected thermally to said hollow protrusion to heat water through said hollow protrusion;

a liquid collecting unit mounted on said water container, and having a second bottom wall covering said chamber, a steam supply hole formed in said second bottom wall, and a blocking ring surrounding said steam supply hole and projecting upwardly from said second bottom wall;

a steaming tray mounted on said liquid collecting unit, and adapted to receive food; and a lid for covering said steaming tray.

2. The food steaming device as claimed in claim 1, wherein said base has an upward peripheral wall and a receiving space between said heating element and said upward peripheral wall, said water container having a lower portion received in said receiving space and in sealing contact with said upward peripheral wall of said base.

3. The food steaming device as claimed in claim 1, wherein said heater further has a safety switch disposed in said base to be pressed downwardly by said water container.

4. The food steaming device as claimed in claim 1, wherein said steaming tray has a plurality of steam holes.

5. The food steaming device as claimed in claim 1, further comprising a quick steam producing cap provided around said hollow protrusion, and including a jacketed tubular wall which has a sealed insulating space, and a top end wall covering one end of said tubular wall, said tubular wall having a bottom open end and a water inlet proximate to said bottom open end, said top end wall having a plurality of perforations.

6. The food steaming device as claimed in claim 5, wherein said top end wall has a peripheral end in sealing contact with said blocking ring, said perforations intercommunicating fluidly said steam holes and said quick steam producing cap.

* * * * *